United States Patent [19]
Howes et al.

[11] Patent Number: 6,045,834
[45] Date of Patent: Apr. 4, 2000

[54] COMPOSITIONS AND METHODS FOR REMOVAL OF MYCOTOXINS FROM ANIMAL FEED

[75] Inventors: A. Dean Howes, Nanpa, Id.; Kyle E. Newman, Corinth, Ky.

[73] Assignee: Alltech, Inc., Nicholasville, Ky.

[21] Appl. No.: 09/293,068

[22] Filed: Apr. 16, 1999

Related U.S. Application Data

[60] Provisional application No. 60/082,134, Apr. 17, 1998.

[51] Int. Cl.⁷ ..................................................... A23K 1/06
[52] U.S. Cl. ............................... 426/2; 426/656; 426/807
[58] Field of Search .................. 424/406, 442; 435/259, 255.1; 426/2, 286, 335, 656, 655, 623, 807

[56] References Cited

U.S. PATENT DOCUMENTS

| | | | |
|---|---|---|---|
| 3,961,080 | 6/1976 | Sugimoto et al. | 426/60 |
| 4,251,519 | 2/1981 | Robbins et al. | 424/180 |
| 4,765,992 | 8/1988 | Geneix et al. | 426/15 |
| 5,149,549 | 9/1992 | Beggs | 426/2 |
| 5,165,946 | 11/1992 | Taylor et al. | 426/74 |
| 5,192,547 | 3/1993 | Taylor | 424/438 |
| 5,639,492 | 6/1997 | Turk et al. | 426/2 |
| 5,922,373 | 7/1999 | Johnston | 426/2 |

FOREIGN PATENT DOCUMENTS

| | | |
|---|---|---|
| 0551331B1 | 11/1995 | European Pat. Off. . |
| 0721741 | 1/1996 | European Pat. Off. . |

OTHER PUBLICATIONS

H.J. Peppler, "Production of Yeasts and Yeasts Products," Microbial Technology, 2nd ed., Academic Press, Inc., p. 159–185, (1979) vol. 1.

*Primary Examiner*—Keith D. Hendricks
*Attorney, Agent, or Firm*—King and Schickli, PLLC

[57] ABSTRACT

A method of removing mycotoxins from animal feeds is described whereby a combination of a modified yeast cell wall extract and a mineral clay is fed to animals in amounts sufficient to inactivate mycotoxins present in the feeds. The yeast cell wall extract/clay mixture may be admixed with feeds, incorporated directly into pelleted feeds, or fed directly to animals.

21 Claims, No Drawings

COMPOSITIONS AND METHODS FOR REMOVAL OF MYCOTOXINS FROM ANIMAL FEED

This application claims the benefit of priority in provisional application Ser. No.: 60/082,134, filed on Apr. 17, 1998.

FIELD OF THE INVENTION

The present invention is directed to compositions and methods for reducing or ameliorating the absorption of a variety of mycotoxins in animal feeds, thus improving nutritional quality of the feeds and subsequent health and performance of animals consuming them. In particular, the compositions of the invention are comprised of a combination of a modified yeast cell wall extract and a clay, e.g., a zeolite, bentonite, or other aluminosilicate clay. This combination has a surprising and unexpected additive binding effect for reducing mycotoxin contamination in animal feedstuffs.

BACKGROUND OF THE INVENTION

Every year a substantial percentage of the world's grain and hay supply for animal feeds is contaminated by toxins produced by invading molds. Decreased feed nutritive value and instances of animal poisoning are most often traced to growth of various species of Aspergillus, Fuserium, and Penicillium in stored grain or other feeds. Mycotoxins affect feed nutritive value, livestock performance, and animal health. Mycotoxin contaminated feeds are considerably less palatable to the animal, and the resulting decreased intake levels may exacerbate poor performance and/or toxicity problems.

Mycotoxin formation may occur when the causative fungi grow on crops in the field, at harvest, in storage, or during feed processing; essentially whenever favorable conditions for their formation prevail. Generalizations about geographical distribution of particular types of mycotoxins are difficult due to widespread distribution of the causative fungi. However, aflatoxins and fumonisin tend to prevail in warmer climates, while cooler regions with higher moisture are subject to ochratoxin, zearalenone, vomitoxin (deoxynivalenol, DON), T2 toxin, and others. Each mycotoxin has its own particular effect, and all can be devastating. Co-contamination by one or more types of mycotoxin occurs naturally, and exerts a greater negative impact on health and productivity of livestock than contamination by individual mycotoxins.

The physical effects of mycotoxins range from reduced feed intake and poor feed conversion to a general inability of an animal to thrive. Symptoms vary according to toxin. Vomitoxin, called the feed refusal factor, affects mainly pigs. Zearalenone affects the reproductive organs of pigs and dairy cattle. Fumonisin causes a nervous disorder in horses due to its impact in the brain. Ochratoxin causes kidney damage. Poultry and pigs are sensitive to ochratoxin, whereas dairy cattle can tolerate higher levels of ochratoxin because of its biotransformation into a nontoxic form by ruminal bacteria. Aflatoxins, the most common mycotoxin, cause increased susceptibility to disease. At the organ or cellular level mycotoxins differ in their effects with severe damage done to the liver and kidney by aflatoxins and on reproductive organs by zearalenone. Other indices of mycotoxicosis include mammary gland swelling and ovarian atrophy (zearalenone), oral lesions in chicks (T2 toxins), nervous system disorders and necrosis of the extremities (ergot alkaloids). Mycotoxins may also impact human health, as many are transferred into milk or meat following ingestion by the animal. For example, aflatoxins appear in milk as aflatoxin M1, a metabolite.

Acute symptoms of mycotoxicosis are often relatively easy to identify. However, chronic symptoms including slightly diminished performance and/or immunosuppression may result in greater economic losses. Traditional methods of dealing with mycotoxins include use of mold inhibitors to prevent mold growth in stored feeds. However, particularly in the livestock industries, economic circumstances force producers to find ways to use mycotoxin-contaminated feeds. Common methods have included dilution of contaminated feeds with feedstuffs known to be free of mycotoxins, physical separation to remove highly contaminated feeds, and ammoniation or heating to detoxify the feeds. These methods are labor-intensive and uneconomical, and may be ineffective against certain mycotoxins.

A more viable method of dealing with mycotoxin-contaminated feeds is to blend in substance capable of binding out the toxins, thus preventing absorption of the toxins into the animal's bloodstream. Few chemicals have proven successful enough to use commercially. Among these, use of mineral clays as binders has proven common. For example, U.S. Pat. No. 5,149,549 teaches the use of a montmorillonite clay, particularly a bentonite clay, admixed with animal feeds as a mycotoxin binder. U.S. Pat. No. 5,165,946 teaches the use of a montmorillonite clay in combination with a suitable sequestrant, particularly phosphate and polyphosphate salts, as a mycotoxin binder. U.S. Pat. No. 5,639,492 further refines the art, teaching the use of an acid-activated calcium bentonite clay admixed with animal feeds to reduce effects of mycotoxin contamination. However, clays as mycotoxin binders have significant limitations. Clays must be included in animal feeds at high levels to effect significant mycotoxin binding. Additionally, most clays have a limited binding efficacy range, binding only aflatoxins to any significant extent Further, in domestic livestock production situations, excreted clays may cause problems with clogging of manure handling equipment. Thus, a need exists for a mycotoxin-binding agent, effective against a wide range of mycotoxins, which can be admixed with animal feeds at lower inclusion rates than is currently possible with substances commonly used to bind mycotoxins in feeds.

SUMMARY OF THE INVENTION

Accordingly, it is a primary object of the present invention to provide a method for binding and consequent inactivation of mycotoxins present in common animal feedstuffs.

It is a further object of the present invention to provide a method for binding and inactivation of mycotoxins present in animal feeds comprising a combination of a modified yeast cell wall extract and a mineral clay such as a zeolite or bentonite clay, or aluminum silicate.

Yet another object of the present invention is to provide a composition comprising a combination of a modified yeast cell wall extract and a mineral clay as described above which provides a surprising and unexpected additive binding effect for reducing mycotoxin contamination in animal feedstuffs.

Still another object of the present invention is to provide a composition comprising a combination of modified yeast cell wall extract and a mineral clay as described above which may be admixed with animal feeds at lower inclusion rates than are required for other commonly available mycotoxin-binders suitable for inclusion in animal feeds.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel method is described for binding mycotoxins present in animal feeds. In particular, in a preferred embodiment, the invention provides a method and a composition for binding mycotoxins present in animal feed rations encompassing a modified yeast cell wall extract and aluminosilicate. The yeast cell wall is extracted from a yeast organism which can be any of a number of yeasts. The aluminosilicate is a standard commercial grade available from a variety of sources.

The compositions provided by the invention can be fed to any animal including, but not limited to, avian, bovine, porcine, equine, ovine, caprine, canine, and feline species. When admixed with feed or fed as a supplement, the compositions with their surprisingly increased mycotoxin-binding capacity, decrease absorption or uptake of the mycotoxins by the affected animal, thereby improving performance and health, and reducing the incidence of mycotoxin-associated diseases.

DETAILED DESCRIPTION OF THE INVENTION

The present invention is based upon the surprising discovery that a yeast cell wall-derived extract in combination with a mineral clay provides an unexpected additive binding effect on mycotoxins in animal feeds. Thus, the invention provides a method and a composition for binding mycotoxins present in animal feeds utilizing a yeast cell wall extract/clay combination.

The yeast organism used for the composition of the present invention may be any of a number of edible yeasts including, but not limited to, Saccharomyces, Candida, Kluyveromnyces, or Torulaspora species. In a preferred embodiment, the yeast used is *Saccharomyces cerevisiae* strain 1026. The yeast cell wall extract is obtained by methods commonly known in the art (See, Peppler, H. J. 1979. Production of yeasts and yeast products. Page 157 in: Microbial Technology & Microbial Processes, Vol.1 (2d Ed.), Academic Press).

Briefly, the yeast organism is grown following common techniques used in food-related fermentations and the beverage industries. Any of a number of common sugar-containing media, such as diluted molasses, may be used to provide a source of sugars for growth of the yeasts. Other media which may be employed include wood sugars, sulfite waste liquor, and whey. The yeast biomass may then be separated and washed by centrifugation to yield a yeast cream.

Following separation, the organism is lysed. Any of a number of methods common in the art may be utilized to lyse the yeast organisms, including autolysis and hydrolysis. A preferred embodiment of the current invention allows the yeast organisms to autolyse at room temperature and pressure over a 12–24 hr period. A protease such as papain or any of a number of alkaline or neutral proteases may be added during the lysis phase to accelerate solubilization of yeast proteins and prevent agglutination of intracellular components. Following autolysis, the resultant yeast cell wall extract is washed several times by centrifugation to remove intracellular components and concentrate the extract. The resulting extract concentrate may be dried by any of a number of methods common in the art, including spray-drying or drum drying to form a hygroscopic, water-soluble powder.

The present invention also provides a method of enhancing and improving the mycotoxin-binding characteristics of a yeast cell wall extract comprising modification of the mannanoligosaccaride (MOS) portion of the cell wall by an alcohol shocking of the yeast organism during growth, e.g. during fermentation, resulting in a thickening of the yeast cell wall and an increase in the surface area available for mycotoxin binding of the resultant cell wall extract Any of a number of standard commercially available alcohols may be used, including, but not limited to methyl, ethyl, and isopropyl alcohols. In a preferred embodiment of the current invention, the alcohol-shock of the yeast organism is accomplished using ethyl alcohol. The alcohol shock of the yeast organisms can be performed by exposing the yeast organism to an environment comprising between about 5% and about 20% alcohol during growth. In a further embodiment the yeast organism is exposed to an environment comprising between 8% to 15% alcohol during growth. In a presently preferred embodiment, the yeast organism is exposed to an environment comprising between 10% and about 12% alcohol during growth.

The mineral clays used in the composition of the present invention may be any of a number of standard commercial grade clays suitable for inclusion in animal diets, including, but not limited to, zeolite and bentonite clays, or aluminosilicate. Clays may be obtained from a variety of commercial sources. In a particularly preferred embodiment, the invention comprises inclusion of alunminosilicate, available from a variety of commercial sources.

In a preferred embodiment, the composition of the present invention comprises between about 1% and about 10% aluminum silicate, and between about 90% and about 99% modified yeast cell wall extract A preferred composition of the invention comprises from between about 4% to about 8% aluminum silicate and between about 92% and about 96% yeast cell wall extract. An especially preferred embodiment of the invention comprises from between 5% to about 7% aluminum silicate and between about 93% and about 95% yeast cell wall extract. The preferred physical form of the invention is a dry, free-flowing powder suitable for direct inclusion into animal feeds or as a supplement to a total mixed ration.

The compositions provided by the present invention can be added to any commercially available feedstuffs for livestock or companion animals including, but not limited to, grains or pelleted concentrates. The composition provided by the present invention may be incorporated directly into commercially available pelleted feeds or fed supplementally to commercially available feeds. When incorporated directly into animal feeds, the present invention may be added to such feeds in amounts ranging from 0.25 to about 4 kilograms per ton of feed. In a preferred composition, the invention is added to feeds in amounts ranging from 0.5 to about 3 kilograms per ton of feed. In an especially preferred composition, the invention is added to feeds in amounts ranging from 1 to 2 kilograms per ton of feed. The composition contained in the present invention may be fed to any animal, including but not limited to, avian, bovine, porcine, equine, ovine, caprine, canine, and feline species.

The methods of the invention comprise increasing binding and removal of mycotoxins from animal feedstuffs, including, but not limited to, Aflatoxin, Zearalenone, Vomitoxin, Fumonisins, T2 toxin, and Ochratoxin, thereby increasing safety and nutritional value of the feed and the overall health and performance of the animal. The compositions of the invention are especially effective in increasing binding of Aflatoxin, Zearalenone, and Fumonisin compared to binding obtained with individual components of the invention alone.

The composition contained in the present invention may be added to mycotoxin-contaminated animal feedstuffs in amounts from about 0.0125% to 0.4% by weight of feed. In a preferred embodiment, the composition is added to mycotoxin-contaminated animal feedstuffs in amounts from about 0.025% to 0.2% by weight of feed. In an especially preferred embodiment, the invention is added to mycotoxin-contaminated animal feedstuffs in amounts from about 0.04% to 0.1% by weight of feed.

Alternatively, the composition contained in the present invention may be directly fed to animals as a supplement in amounts ranging from 2.5 to 20 grams per animal per day. An especially preferred embodiment comprises feeding the composition contained in the present invention to animals in amounts ranging from 10 to 15 grams per animal per day. One of skill in the art can appreciate that the amount of the composition fed can vary depending upon the animal species, size of the animal and the type of feedstuff to which the composition is to be added.

EXAMPLES

The following examples are intended to be illustrative of the invention, and are not to be considered restrictive of the scope of the invention as otherwise described herein.

Example 1

The following experiments demonstrate the in vitro mycotoxin-binding capacity of the compositions provided by the current invention. All experiments were done in aqueous solution. The specified toxins were added at concentrations of 2 μg/ml. One mg the modified yeast cell wall extract/aluminosilicate combination in a ratio of about 94% yeast cell wall extract to about 6% aluminum silicate was added to the mixture and held for one hour with vortexing. Adsorbents were removed by centrifugation.

TABLE 1

IN VITRO BINDING OF MYCOTOXINS[a]

| Mycotoxin[b] | % Bound[c] |
|---|---|
| Aflatoxin B1 | 95.2 |
| Fumonisin B1 | 19.9 |
| Vomitoxin | 9.6 |
| T2 Toxin | 26.6 |
| Zearalenone | 44.7 |
| Ochratoxin | 8.8 |

[a]Binding assay carried out in aqueous media over a 1 hour incubation period. Mycotoxin concentrations were analyzed using standard HPLC procedures. Adsorbent added at 1 mg/culture tube.
[b]Toxin concentration = 2 μg/ml.
[c]Compared to adsorbent-free control cultures.

The composition provided by the present invention was most effective in binding Aflatoxin, followed by Zearalenone, T2 toxin, and Fumonisin. Binding of Vomitoxin (DON) and Ochratoxin was roughly equivalent. In similar experiments, the binding capacity of the composition provided by the present invention was tested for a range of mycotoxins in contaminated feed (TABLE 2). Similar results were observed, except that binding of Fumonisin was more efficient than T2 toxin.

TABLE 2

IN VITRO ADSORPTION OF MYCOTOXINS IN CONTAMINATED FEED

| Mycotoxin | Strong Binding (%)[a] |
|---|---|
| Aflatoxins | 85.23 |
| Zearalenone | 66.66 |
| Vomitoxin | 12.58 |
| Ochratoxin | 12.49 |
| T2 Toxin | 33.39 |
| Fumonisin | 67.00 |

[a]Compared to nonspecific binding in negative control cultures.

Example 2

The following experiments compare the mycotoxin-binding capacity of the composition provided by the present invention to other adsorbents. Table 3 illustrates comparative binding of mycotoxins by the present invention compared to yeast cell debris alone. Assay procedures were similar as described for data presented in Table 1, except that mycotoxin concentrations in solution were determined using a commercially available direct competitive enzyme-linked immunosorbent assay (Veratox® Quantitative mycotoxin test).

TABLE 3

COMPARATIVE BINDING OF MYCOTOXINS[a]

| | Adsorbent[b] | |
|---|---|---|
| Mycotoxin | Yeast Cell Wall Extract/Aluminosilicate | Yeast Cell Debris |
| Aflatoxin | 84 | 24 |
| T2 Toxin | 0 | 5 |
| Vomitoxin | 12 | 0 |
| Ochratoxin | 42 | 0 |
| Zearalenone | 71 | 79 |

[a]Expressed as % bound compared to adsorbent-free control. Mycotoxins were added at a concentration of 2 μg/ml. Toxin concentrations were analyzed using a commercial ELISA test kit (Veratox ® Quantitative mycotoxin test).
[b]Adsorbents added at 1 mg per culture.

Compared to yeast cell debris alone, the composition provided by the present invention bound significantly more of all mycotoxins tested except for Zearalenone. Table 4 demonstrates a comparison of in vitro mycotoxin-binding capacity of the composition provided by the present invention compared to other commercial binding agents.

TABLE 4

COMPARATIVE MYCOTOXIN-BINDING CAPACITIES OF VARIOUS ADSORBENTS IN VITRO

| | Mycotoxin | | | |
|---|---|---|---|---|
| Adsorbent | Aflatoxin | Zearalenone | Fumonisin | Vomitoxin |
| Yeast cell wall extract/aluminosilicate | 95 | 52 | 45 | 10 |
| Diatomaceous Earth | 47 | 12 | 17 | ND[a] |
| Aluminosilicate | 58 | 5 | 5 | ND |

[a]Not Done.

The composition provided by the present invention showed marked improvements in strong mycotoxin binding compared to other binders tested. Similarly, the composition provided by the present invention markedly improved in vitro binding of Aflatoxin in contaminated poultry feed compared to binding by hydrated sodium calcium aluminosilicate (HSCAS) alone (TABLE 5).

TABLE 5

COMPARATIVE BINDING OF AFLATOXIN IN CONTAMINATED POULTRY FEED[a]

| Aflatoxin[b] | Adsorbent Yeast cell wall extract/aluminosilicate HSCAS[c] | | | | | |
|---|---|---|---|---|---|---|
| | 0.0125 | 0.025 | 0.05 | 0.1 | 0.2 | 0.4 |
| 50 | 33 | 58 | 83 | 3 | 26 | 54 |
| 100 | 48 | 58 | 69 | 14 | 47 | 78 |
| 200 | 51 | 62 | 79 | 25 | 65 | 78 |

[a]Results expressed as % bound compared to control without adsorbent.
[b]Parts per billion.
[c]Hydrated sodium calcium aluminosilicate.

Improvements in mycotoxin binding by the composition provided by the present invention were observed at significantly lower concentrations than were required for HSCAS.

These results show that the composition provided by the present invention, i.e. a modified yeast cell wall extract in combination with a suitable mineral clay, provides an effective method for removal of mycotoxins in contaminated animal feeds at lower inclusion rates than are required for other commonly used binders.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitable entitled.

What is claimed is:

1. A composition for binding and thereby inactivating a mycotoxin in an animal feed, comprising a modified yeast cell wall extract and a mineral clay.

2. The composition of claim 1, wherein the yeast cell wall is extracted from a yeast selected from the group consisting of Saccharomyces, Candida, Kluyveromyces, Torulaspora or a combination thereof.

3. The composition of claim 2, wherein the yeast cell wall extract is extracted from a *Saccharomyces cerevisiae* yeast.

4. The composition of claim 1, wherein the yeast cell wall is modified prior to extraction.

5. The composition of claim 4, wherein the yeast cell wall is modified by an alcohol shocking of the yeast thereby increasing the mycotoxin-binding capacity of the yeast cell wall.

6. The composition of claim 5, wherein the yeast cell wall is modified by exposing the yeast to a growth environment comprising from between about 5% and about 20% alcohol.

7. The composition of claim 6, wherein the yeast cell wall is modified by exposing the yeast to a growth environment comprising from between about 10% and about 12% alcohol.

8. The composition of claim 1, wherein the mineral clay is selected from the group consisting of a zeolite, a bentonite, an aluminosilicate or mixtures thereof.

9. The composition of claim 8, wherein the mineral clay is an aluminosilicate clay.

10. The composition of claim 1, wherein the composition comprises from between about 1% to about 10% of the mineral clay and from between about 90% to about 99% of the yeast cell wall extract.

11. The composition of claim 10, wherein the composition of the invention comprises form between about 2% to about 4% of the mineral clay, and from between about 96% to about 98% o the yeast cell wall extract.

12. The composition of claim 1, formulated for feeding to an animal selected from the group consisting of avian, bovine, porcine, equine, ovine, and caprine species.

13. The composition of claim 1, wherein at least a portion of the composition is bound to a mycotoxin.

14. The composition of claim 13, wherein the mycotoxin is selected from the group consisting of Aflatoxin, Zearalenone, Vomitoxin, Fumonisins, T2 toxin, and Ochratoxin.

15. An animal feed comprising a composition comprised of a modified yeast cell wall extract and a mineral clay in an amount effective to bind and thereby inactivate a mycotoxin present in the animal feed.

16. The animal feed of claim 15, wherein the effective amount of the composition comprises from between about 0.0125% to between about 4% by weight of the feed.

17. A method for reducing mycotoxin contamination of an animal consuming a feedstuff, comprising feeding to an animal an effective amount of a composition comprising a modified yeast cell wall extract and a mineral clay thereby binding and inactivating the mycotoxin in the animal feed.

18. The method of claim 17, wherein the effective amount of the composition comprises from between about 0.0125% to between about 4% by weight of the animal's daily feed ration.

19. The method of claim 17, wherein the animal is selected from the group consisting of avian, bovine, porcine, equine, ovine, and caprine species.

20. The method of claim 17, wherein the mycotoxin is selected from the group consisting of Aflatoxin, Zearalenone, Vomitoxin, Fumonisins, T2 toxin, and Ochratoxin.

21. The method of claim 17, wherein the composition is admixed with the animal feed prior to feeding.

* * * * *

UNITED STATES PATENT AND TRADEMARK OFFICE
CERTIFICATE OF CORRECTION

PATENT NO. : 6,045,834
DATED : April 4, 2000
INVENTOR(S) : A. Dean Howes; Kyle E. Newman Page 1 of 1

It is certified that error appears in the above-identified patent and that said Letters Patent is hereby corrected as shown below:

Column 2,
Line 38, after the word "extent" add a -- . --

Column 3,
Lines 42 and 43, the yeast group should be italicized so as to read -- *Saccharomyces, Candida, Kluyveromyces*, or *Torulaspora* --

Column 4,
Line 11, "mannanoligosaccaride" should be spelled as -- mannanoligosaccharide --
Line 15, after the word "extract" add a -- . --
Line 35, "alunminosilicate" should be spelled as -- aluminosilicate --
Line 40, after the word "extract" add a -- . --

Claims,
Column 7, claim 2,
Line 50, the yeast group should be italicized so as to read, -- *Saccharomyces, Candida, Kluyveromyces, Torulaspora* --

Column 8, claim 11,
Line 18, the word "form" should be -- from --
Line 21, after the word "98%" the "o" should read -- of --

Column 8, claim 17,
Line 40, following the word "clay" please add a -- , --.

Signed and Sealed this

Thirtieth Day of October, 2001

Attest:

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,045,834 C1  
APPLICATION NO. : 90/008406  
DATED : June 7, 2011  
INVENTOR(S) : A. Dean Howes et al.

Page 1 of 1

It is certified that error appears in the above-identified patent and that said Letters Patent is hereby corrected as shown below:

In column 1, line (73) Assignee, delete "Bank of America, N.A., Chicago, IL", insert --Alltech, Inc., Nicholasville, Ky--.

Signed and Sealed this
Fifteenth Day of November, 2011

David J. Kappos
*Director of the United States Patent and Trademark Office*

(12) EX PARTE REEXAMINATION CERTIFICATE (8299th)
United States Patent
Howes et al.

(10) Number: US 6,045,834 C1
(45) Certificate Issued: Jun. 7, 2011

(54) COMPOSITIONS AND METHODS FOR REMOVAL OF MYCOTOXINS FROM ANIMAL FEED

(75) Inventors: A. Dean Howes, Nanpa, ID (US); Kyle E. Newman, Corinth, KY (US)

(73) Assignee: Bank of America, N.A., Chicago, IL (US)

Reexamination Request:
No. 90/008,406, Feb. 8, 2007

Reexamination Certificate for:
Patent No.: 6,045,834
Issued: Apr. 4, 2000
Appl. No.: 09/293,068
Filed: Apr. 16, 1999

Certificate of Correction issued Oct. 13, 2001.

Related U.S. Application Data
(60) Provisional application No. 60/082,134, filed on Apr. 17, 1998.

(51) Int. Cl.
*A23K 1/00* (2006.01)
*A23K 1/175* (2006.01)
*A23K 3/00* (2006.01)

(52) U.S. Cl. .............. 426/2; 426/656; 426/807
(58) Field of Classification Search .................. None
See application file for complete search history.

(56) References Cited

U.S. PATENT DOCUMENTS

| | | | |
|---|---|---|---|
| 4,015,018 A | 3/1977 | Glabe et al. | |
| 4,055,667 A | 10/1977 | Linton et al. | |
| 4,289,643 A | 9/1981 | Joubert | |
| 4,626,472 A | 12/1986 | Boutin | |
| 4,765,992 A | 8/1988 | Geneix et al. | |
| 4,847,243 A | 7/1989 | Wallace | |
| 4,880,632 A | 11/1989 | Lipham et al. | |
| 5,149,549 A | 9/1992 | Beggs | |
| 5,165,946 A | 11/1992 | Taylor et al. | |
| 5,192,547 A | 3/1993 | Taylor | |
| 5,372,818 A | 12/1994 | Cross et al. | |
| 5,639,492 A | 6/1997 | Turk et al. | |
| 5,718,900 A | 2/1998 | Hill et al. | |
| 5,935,623 A | 8/1999 | Alonso-Debolt | |
| 6,045,834 A | 4/2000 | Howes et al. | |
| 6,344,221 B1 | 2/2002 | Evans | |
| 2003/0007982 A1 | 1/2003 | Surai et al. | |

FOREIGN PATENT DOCUMENTS

| | | |
|---|---|---|
| EP | 0 311 195 B1 | 8/1993 |
| EP | 1 079 696 B1 | 3/2007 |
| JP | 7274947 | 10/1995 |

OTHER PUBLICATIONS

Defendant Cenzone Tech, Inc.'s Responses to Plaintiff's Second Set of Interrogatories (Nos. 12–19), dated Jan. 11, 2007.

Defendant Cenzone Tech, Inc.'s Supplemental Responses to Plaintiff Alltech, Inc.'s Second Set of Interrogatories (Nos. 12–19), dated Jan. 26, 2007.

Defendant Cenzone Tech, Inc.'s Second Supplemental Responses to Plaintiff Alltech, Inc.'s Second Set of Interrogations (Nos. 12–19), dated Apr. 2, 2007.

Defendant Cenzone Tech, Inc.'s Third Supplemental Responses to Plaintiff's Second Set of Interrogatories (Nos. 12–19), dated Apr. 19, 2007.

Defendant Cenzone Tech, Inc.'s Fourth Supplemental Responses to Plaintiff's Second Set of Interrogatories (12–19), dated May 25, 2007.

Defendant Cenzone Tech, Inc.'s Response to Interrogatories Propounded by Plaintiff Alltech, Inc. (Set No. 1), dated Jun. 7, 2006.

Expert Report of Jacques Goulet, dated May 1, 2007.

Appendix B to the Expert Report of Jacques Goulet, dated May 1, 2007.

Expert Report of Trevor Smith, dated May 25, 2007.

Rebuttal to the Expert Report of the Inge Russell by Jacques Goulet, dated May 25, 2007.

Ingredient list for Inticorp Re–New Whole [INTI0081; Pusillo Depo. Ex. 3], dated Nov. 7, 1995.

Electro–Tox Ingredient List [INTI0019–INTI0020; Pusillo Depo. Ex. 4], dated Dec. 19, 1998.

Analysis of Super #190 Premix with Bovatec [INTI0250–INTI0253; Pusillo Depo. Ex. 5].

Analysis of Super #190 Premix [INTI–0254–INTI0255; Pusillo Depo. Ex. 6].

Analysis of Medow Mate #7 [INTI1047–INTI1048; Pusillo Depo. Ex. 7].

Analysis of Yeast Special [INTI0738]; Pusillo Depo. Ex. 8].

Analysis of Yeast Special [INTI0034]; Pusillo Depo. Ex. 9].

Alltech 1995 Research Roundtable [INTI0004]; Pusillo Depo. Ex. 10].

United Suppliers—Live Data Sales [INTI17066–INTI17082] Pusillo Depo. Ex. 17].

Memorandum of Points and Authorities in Support of Cenzone Tech's and Wu's Motion for Summary Judgment of Invalidity of Patent 6,045,834, dated Jun. 12, 2007.

(Continued)

*Primary Examiner*—Sharon Turner

(57) ABSTRACT

A method of removing mycotoxins from animal feeds is described whereby a combination of a modified yeast cell wall extract and a mineral clay is fed to animals in amounts sufficient to inactivate mycotoxins present in the feeds. The yeast cell wall extract/clay mixture may be admixed with feeds, incorporated directly into pelleted feeds, or fed directly to animals.

At the time of issuance and publication of this certificate, the patent remains subject to pending reissue application number 12/651,887 filed Jan. 4, 2010. The claim content of the patent may be subsequently revised if a reissue patent is issued from the reissue application.

OTHER PUBLICATIONS

Cenzone Tech and Wu's Notice of Lodgment in Support of Motion for Summary Judgment of Invalidity of Patent 6,045,834 ("NOL").

NOL Ex. 1—Howes, U.S. Patent No. 6,045,834 ("834 Patent") [A000100–A000105].

NOL Ex. 2—Lyons, 1990, The Scientific Basis for the Fermentation Product Yeast Culture, Milling Flour and Feed, Feb. 1990 [INTI0230–0233].

NOL Ex. 3—'834 Patent Initial Disclosure Statement (IDS) documents.

NOL Ex. 4—Lyons, 1995, "Biotechnology in the Feed Industry: A look forward and backward," pp. 1–29. [C000063–C000078].

NOL Ex. 5—Trenholm, et al., 1996, "Mycotoxin Binding Agents: An Update on What We Know," pp. 327–349. [C000124–136].

NOL Ex. 6—Mahesh & Devegowda, 1996 poster, "Ability of Aflatoxin Binders to Bind Aflatoxin in Contaminated Poultry Feeds and Liquid Media in vitro" [[C000596].

NOL Ex. 7—Bio-Mos Material Safety Data Sheet.

NOL Ex. 8—Devegowda 1997 African lecture article [C000016].

NOL Ex. 9—Mahesh & Devegowda 1996 Poultry Congress [C000162].

NOL Ex. 10—Devegowda et al., 1997, Immunosuppression in Poultry Caused by Aflatoxins and its Alleviation by *Saccharomyces Cerevisiae* (Yea–Sacc) and Mannanoligosaccharides (Mycosorb), pp. 205–215. [C000154–C000160].

NOL Ex. 11—Linton, U.S. Patent No. 4,055,667 [C000001–C000009].

NOL Ex. 12—Re–Exam Request for '834 patent; Notice of Re-Examination.

NOL Ex. 13—MTB-100 labels with patent marking [C003017; C003019].

NOL Ex. 14—Howes Deposition excerpts pp. 116–122.

NOL Ex. 15—Sustainer Formulation w/ Zeolex [INTI000003].

NOL Ex. 16—Sustainer Formulation w/ Tixosil [INTI000021].

NOL Ex. 17—Apr. 27, 2007 Pusillo Deposition, pp. 8, 14–15, 22, 48–54, 75–82.

NOL Ex. 18—Sales report showing Sustainer [INTI017066–INTI017082].

NOL Ex. 19—Re-New formulation [INTI000085; INTI002216].

NOL Ex. 20—Yeast Special label mock–up [INTI000293].

NOL Ex. 21—Meadow Mate 7 formulation [INTI002264–INTI002267; INTI002761].

NOL Ex. 22—Dec. 1, 1994 Letter from Gary Pusillo to Annette Maze re: mixture [INTI002240–INTI002241].

NOL Ex. 23—Annette Maze Deposition.

NOL Ex. 24—Aqua–Plus label [C000479].

NOL Ex. 25—California PUC 760 area code doc excerpt.

NOL Ex. 26—Aqua–Plus shipping and sales documents [C001536–C001539].

NOL Ex. 27—Excerpts from Aug. 3, 2006 Deposition of J. Wu, pp. 284–285.

NOL Ex. 28—Alltech website with Mycosorb/ Aquaculture.

NOL Ex. 29—Lyons, 1994, Biotechnology in the Feed Industry: 1994 and Beyond: A Panorama of techniques, processes and products to address animal production problems today and tomorrow, pp. 1–48. [C000030–C000055].

NOL Ex. 30—Newman, 1994, "Mannan–Oligosaccharides: Natural Polymers with Significant Impact on the Gastrointestinal Microflora and the Immune System," pp. 167–174. [C000652–C000660].

NOL Ex. 31—Devegowda et al., 1994, "A Biological Approach to Counteract Aflatoxicosis in Broiler Chickens and Ducklings by the Use of *Saccharomyces Cerevisiae* Cultures Added to Feed," pp. 235–245. [C000056–C000062].

NOL Ex. 32—Wyatt, 1995, "Molds, Mycotoxins, and the Problems They Cause," pp. 33–39.

NOL Ex. 33—Charmley, Trenholm, and Prelusky, 1995, "Mycotoxins: Their Origin, Impact and Importance: Insights into Common Methods of Control and Elimination," pp. 41–63. [C000079–C000091].

NOL Ex. 34—Leibetseder, 1995, "The European Perspective on Mycotoxins," pp. 65–74. [C000092–C000098].

NOL Ex. 35—Spring, 1995, "Competitive Exclusion of *Salmonella* Using Bacterial Cultures and Oligosaccharides," pp. 383–387.

NOL Ex. 36—Olsen, 1995, "Mannanoligosaccharides: Experience in Commercial Turkey Production," pp. 389–392.

NOL Ex. 37—Lyons, 1996, "Goal 2000: A Truly Global Science–Based Company That Responds Rapidly to Emerging Issues," pp. 1–20. [C000117–C000123].

NOL Ex. 38—Savage and Zakrzewska, 1996, "The Performance of Male Turkeys Fed a Starter Diet Containing a Mannanoligosaccharide (Bio–Mos) from Day Old to Eight Weeks of Age," pp. 47–54. [C000099–C000110].

NOL Ex. 39—Killeen and Rosell, 1996, "The Potential of Polysaccharide Supplements in Diets for Livestock and Pets," pp. 149–158. [C000117–C000123].

NOL Ex. 40—Wallace, 1996, "The Mode of Action of Yeast Culture in Modifying Rumen Fermentation," pp. 217–232.

NOL Ex. 41—Cotter, 1997, Modulation of the Immune Response: Current Perceptions and Future Prospects with an Example from Poultry and Bio–Mos, pp. 195–203.

NOL Ex. 42—Devegowda et al., "Binding Mycotoxins with MOS: Ability of Mannanoligosaccharides to Bind Aflatoxin B1." [A002093].

NOL Ex. 43—Jacques and Newman, "MOS in Diets Fed Neonatal and Growing Calves." [A002094].

NOL Ex. 44—Chandler and Newman, "MOS: Effects on Bacterial Growth, Ability to Absorb Pathogens." [A002095].

NOL Ex. 45—Dvorak, "Effects of Bio–Mos Added to Calf Starter and an All–Milk Milk Replacer on Performance and Health." [A001991–A001993].

NOL Ex. 46—Dvorak, "Mannanoligosaccharide as an Alternative to Growth Promotant Antibiotics for Growing–Finishing Swine." [A001994].

NOL Ex. 47—Nippei Feed Company, Japan, "Effects of Bio–Mos on Performance and Health of Calves Through Six Weeks of Age." [A001995–A001996].

NOL Ex. 48—Sajko and Sk–rko–Sajko, "Effects of Bio–Mos on Performance of Calves Fed Whole Milk." [A001997–A001998].

NOL Ex. 49—McKenzie and Dotsey, "Bio–Mos for Growing Calves: Results on Farm." [A001999].

NOL Ex. 50—Spring, Dawson, and Newman, "Effect of Bio–Mos on Exclusion of *Salmonella* and *E. coli* in Broiler Chicks." [A002000–A002001].

NOL Ex. 51—Stanley et al., "Interaction of Temperature, Aflatoxin, and Mycosorb on the Performance of Boiler Chicks." [A002035–A002037].

NOL Ex. 52–Griffith, "Mannanoligosaccharides in Shrimp Culture in Ecuador: Stimulating Immune Function." [A002048].
NOL Ex. 53—Alltech's Markman Presentation [A005941–A005965].
NOL Ex. 54—Covance Laboratory Report re MTB–100.
NOL Ex. 55—Hohman Deposition excerpts pp. 82–85.
NOL Ex. 56—Newman Deposition excerpts pp. 117–122.
NOL Ex. 57—Cell Wall—Brewer's Yeast [C000579].
NOL Ex. 58—Bio–Mos—A New Era of Natural Alternatives for Animal Nutrition [INTI000141–INTI000142].
NOL Ex. 59—Bio–Mos [INTI000165].
NOL Ex. 60—Alltech Memo re Mycosorb nomenclature [A000211].
NOL Ex. 61—Directory of Feeds and Feed Ingredients, Hoard's Dairyman, p. 29.
NOL Ex. 62—Rebuttal Report by Expert Dr. Goulet.
NOL Ex. 63—Excerpt from Apr. 18, 2007 Deposition of J. Change, p. 163.
NOL Ex. 64—Expert Report by Dr. Goulet.
NOL Ex. 65—Claim Construction Order for United States Patent No. 6,045,834.
NOL Ex. 66—Biomos Label Aug. 2001.
NOL Ex. 67—Declaration of Dr. Jacques Goulet.
Product Structure File Audit Trail [Goulet Ex. 241: A001227–A001231].
Letter from Erickson to Abbey regarding Aqua Feed Directory [Goulet Ex. 243; C000439], dated Oct. 20, 1997.
Alltech, Inc.'s Opposition to Cenzone Tech's and Wu's Motion for Summary Judgment of Invalidity of U.S. Patent 6,045,834.
Cenzone's Reply to Alltech's Opposition Re: Cenzone's Motion for Summary Judgment on Invalidity.
Declaration of Wesley B. Ames in Support of Defendants' Reply to Alltech's Opposition to Cenzone's Motion of Patent Invalidity.
Excerpts from the deposition of Dr. Inge Russell.
Order (1) Denying Defendants' Motion for Summary Judgment on Patent Invalidity, (2) Granting Plaintiff's Motion for Summary Judgment on Patent Infringement, (3) Granting Plaintiff's Motion on No Anticipation by Devegowda References, (4) Granting Plaintiff's Motion for Summary Judgment on Defendants' Antitrust Claim, and (5) Denying Plaintiff's Motion for Summary Judgment on Defendants' Inequitable Conduct Defense.
Cenzone's 35 U.S.C. Section 282 Disclosures.
Memorandum of Points and Authorities in Support of Alltech, Inc's Motion for Summary Judgment on Defendants' Inequitable Conduct Defense.
Memorandum of Points and Authorities in Opposition to Alltech's Motion for Summary Judgment on Defendants' Inequitable Conduct Defense.
Alltech's Reply in Support in its Motion for Summary Judgment on Defendants' Inequitable Conduct Defense.
Memorandum of Points and Authorities in Support of Alltech, Inc's Motion for Summary Judgment on Defendants' Antitrust Claims.
Memorandum on Points and Authorities in Opposition to Alltech's Motion for Summary Judgement on Defendants' Antitrust Claims.
Alltech, Inc.'s Reply in Support of Motion for Summary Judgment on Defendants' Antitrust Claims.
Defendants' Cenzone and Wu's Second Amended Answer and Counterclaims, Nov. 17, 2006.
Defendant Cenzone Tech, Inc.'s Responses to Plaintiff Alltech, Inc.'s Third Set of Interrogatories (No. 20), Jan. 24, 2006.
Defendants Cenzone Tech, Inc. and Jung Fu Wu's Preliminary Invalidity Contentions, Jun. 19, 2006.
Plaintiff's Exchange of Preliminary Claim Construction and Extrinsic Evidence Pursuant to Patent Local Rule 4.1(b), Jul. 6, 2006.
Defendants Cenzone Tech, Inc. and Jung Fu Wu's Preliminary Claim Constructions, Jul. 6, 2006.
Defendants Cenzone Tech, Inc. and Jung Fu Wu's Responsive Claim Constructions, Jul. 20, 2006.
Plaintiff's Responsive Claim Construction Pursuant to Patent Local Rule 4.1(d), Jul. 20, 2006.
Defendant's Joint Claim Construction Chart, Sep. 1, 2006.
Defendant's Joint Claim Construction Worksheet, Sep. 1, 2006.
Defendant's Joint Claim Construction Hearing Statement, Aug. 31, 2006.
Plaintiff's Opening Claim Construction Brief, Oct. 23, 2006.
Declaration of Colin B. Heideman in Support of Plaintiff's Opening Claim Construction Brief, Oct. 23, 2006.
Declaration of Kyle Newman in Support of Plaintiff's Opening Claim Construction Brief, Oct. 23, 2006.
Defendant's Intial Claim Construction Brief, Oct. 23, 2006.
Plaintiff's Responsive Claim Construction Brief, Nov. 6, 2006.
Declaration of Colin B. Heideman in Support of Plaintiff's Responsive Claim Construction Brief, Nov. 6, 2006.
Cenzone Tech, Inc.'s and Jung Fu Wu's Responsive Claim Construction Brief, Nov. 6, 2006.
Supplemental Notice of Lodgment in Support of Cenzone Tech, Inc.'s and Jung Fu Wu's Responsive Claim Construction Brief, Nov. 6, 2006.
Notice of Errata Regarding Supplemental Notice of Lodgment in Support of Cenzone Tech, Inc.'s and Jung Fu Wu's Responsive Claim Construction Brief, Nov. 7, 2006.
Claim Construction Order for U.S. Patent 6,045,834, Jan. 4, 2007.
Notice of Lodgment in Support of Motion for Leave to File Second Amended Answer and Counterclaims, Oct. 27, 2006.
Supplemental Declaration of Wesley B. Ames in Support of Defendant's Motion for Leave to File Second Amended Answer and Counterclaims (filed Nunc Pro Tunc), Nov. 6, 2006.
Tutorial Transcript, Dec. 19, 2006.
Markman Hearing Transcript, Dec. 20, 2006.
Devegowda & Aravind, "Effect of Yea–Saac–on Performance of Broilers During Aflatoxicosis," *Presentation at the $10^{th}$ Annual Symposium on Biotechnology in the Feed Industry*, Apr. 1994, [A 002075], Kentucky.
Veloz & Cardenas, "Effects of Yea–Sacc$^{1026}$ on Performance of Broilers During Mycotoxicosis," Apr. 1997, [A 0022949–A 002250], Venezuela.
Voracek, "World Grain Stores Under Mycotoxin Attack," *Feeding Times*, Oct.–Nov. 1995, p. 22–24, [INTI0147–INTI0149].
Letter regarding US Feeds products, Nov. 20, 1992, [INTI0669].
Rescue 911 Technical Sheet, Oct. 14, 1997, [INTI1188–INTI1189].

Rodrigues, et al., "Effect of *Saccharomyces boulardii* against experimental oral infection with *Salmonella typhimurium* and *Shiegella flexneri* in conventional and gnotobiotic mice," *The Society For Applied Bacteriology: Journal of Applied Bacteriology 81*, 1996, p. 251–256, Brazil.

Bussey, et al., "Binding of Yeast Killer Toxin to a Cell Wall Receptor on Sensitive *Saccharomyces cerevisiae*," *Journal of Bacteriology*, Dec. 1979, p. 888–892, vol. 140, No. 3, Department of Biology, McGill University, Canada.

Sawant & Ahearn, "Involvement of a Cell Wall Receptor in the Mode of Action of an Anti–Candida Toxin of *Pichia anomala*," *American Society of Microbiology: Antimicrobial Agents and Chemotherapy*, Jul. 1990, p. 1331–1335, vol. 34, No. 7, Atlanta, Georgia.

Schmitt & Radler, "Blockage of Cell Wall Receptors for Yeast Toxin KT28 with Antimannoprotein Antibodies," *American Society for Microbiology: Antimicrobial Agent and Chemotherapy*, Aug. 1990, p. 1615–1618, vol. 34, No. 8, Germany.

Coutteau, et al. "Baker's Yeast as a Potential Substitute for Live Algae in Aquaculture Diets: Artemia as a Case Study," *Journal of the World Aquaculture Society*, Mar. 1990, p. 1–9, vol. 21, No. 1, Belgium.

Marketing through Education Annual Symposium 1995, [INTI0245–INTI0249].

Lyons, "Natural and Feed Products: The Scientific Basis for the Fermentation Product Yeast Culture," *Milling Flour and Feed*, Feb. 1989, [INTI0230–INTI0233].

Maeda–Martinez, et al, "Laboratory culture of fairy shrimps using baker's yeast as basic food in a flow–through system," *Hydrobiologia 298*, 1995, p. 141–157, Kluwer Academic Publishers, Belgium.

Posters, Presented at the 12$^{th}$ Annual Symposium Biotechnology in the Feed Industry, Apr. 22–24, 1996, Kentucky [A001967–A001970, and A002034].

Cenzone Tech Inc., Letter from Erickson to Coosey regarding World Aquaculture, Oct. 14, 1997 [C000481].

Aguilar–Usganga & Francois, "A study of the yeast cell wall composition and structure in response to growth conditions and mode of cultivation," The Society of Applied Microbiology, *Letters in Applied Microbiology 37*, 2003, p. 268–287, France.

Meadow Mate All Natural Caprine Products, Letter to Maze from Pusillo regarding Meadow Mate #7, Dec. 1, 1994.

Klis, et al., "Dynamics of Cell Wall Structure in *Saccharomyces cerevisiae*," *Federation of European Microbiological Societies: Microbiology Reviews 26*, 2002, p. 239–256, Elsevier Science B.V., Netherlands.

Lyons, "Goal 2000: A Truley Global Science–Based Company that Responds Rapidly to Emerging Issues," *North American University Tour: Oct. 7–Nov. 1, 1996*, [A002343–A002376].

Trenholm, et al. "Mycotoxin binding agents: an update on what we know," *Zootecnica International*, vol. 20, No. 1, 1997.

Radler, et al. "Killer toxins of yeasts: Inhibitors of fermentation and their absorption," Journal of Food Protection, vol. 50, No. 3, 1987, pp. 234–238.

Website with article from Penn State Veterinary News, Feb. 1998, p. 1–4, "Minimizing Mycotoxin Problems".

Order (1) denying defendants' motion for summary judgment on patent invalidity, (2) granting plaintiff's motion for summary judgment on patent infringement, (3) granting plaintiff's motion on no anticipation by devegowda references, (4) granting plaintiff's motion for summary judgment on defendants' antitrust claim, and (5) denying plaintiff's motion for summary judgment on defendants' inequitable conduct defense. Signed by Judge Jeffrey T. Miller on Jul. 26, 2007.

Minute entry for proceedings held before judge Jeffrey T. Miller: Status Conference held on Aug. 20, 2007. Court is informed that a global settlement has been reached. Entered Aug. 22, 2007.

Order granting injunction and dismissal. Signed by Judge Jeffrey T. Miller on Aug. 21, 2007.

Awan, "Detoxification Effects of Aflatoxin Contamination in the Poultry Feed by Using Different Chemical Techniques", College of Veterinary Sciences, Lahore, Pakistan, 1997, pp. 1–142.

Blanch et al., Comprehensive Biotechnology, The Principles, Applications and Regulation of Biotechnology in Industry, Agriculture and Medicine, vol. 3, Pergamon Press, 1985, pp. 363–365, 875–876.

Devegowda et al., Biotechnology in the Feed Industry, Proceedings of Alltech's Thirteenth Annual Symposium, ed. TY Lyons and KA Jacques, Nottingham University Press, 1997. Immunosupression in Poultry caused by Aflatoxins and its Alleviation by *Saccharomyces Cerevisiae* (YEA–SACC$^{1026}$) and Mannanoligosaccharides(Mycosorb) pp. 205–215.

Devegowda et al., Biotechnology in the Feed Industry, Proceedings of Alltech's Fourteenth Annual Symposium, ed. TP Loyns and KA Jacques, Nottingham University Press, 1998. "Mycotoxin Picture Worldwire Novel Solutions for their Counteraction," pp. 241–255.

Devegowda et al., "Mycotoxin in Feed: Novel Biotechnological Solutions". African Lecture Tour, Mar. 10–15, 1997.

Devegowda et al., "Mycotoxin picture worldwide: Novel Solutions For Their Counteraction", Feed Compounder, Jun./Jul. 1998, pp. 22–27.

Halasz et al., "Use of Yeast Biomass in Food Production", CRC Press, 1991, pp. 12–14, 193.

Harris, "Battling to Maximize Animal Performance: Minimizing mycotoxin problems", Feed Management, Oct. 1997, vol. 28, No. 10, pp. 27–28.

"Mycofix Plus", Biomin G.T.I. GmbH, Erber, AG, packaging label from the year 1998.

"Mycofix Plus", Biomin G.T.I. GmbH, Erber AG, packaging label from the year 1997.

Mahesh et al., "Ability of Aflatoxin Binders to Bind Aflatoxin in Contaminated Poultry Feeds and Liquid Media in vitro", Biotechnology in the Feed Industry, Apr. 1996.

Moyer et al., "Degradation of Ergoline Alkaloids during In Vitro Ruminjal Digestion of Tall Fescue Forage", Crop Science, vol. 33, Mar.–Apr. 1993, pp. 264–266.

Ramos et al., "Prevention of aflatoxicosis in farm animals by means of hydrated sodium calcium aluminosilicate addition to feedstuffs: a review", Animal Feed Science and Technology 65, 1997, 197–206.

Reed et al., "Yeast Technology", 2nd edition, pp. 254, 291, 427, 1991.

Registration Form No. F 3–3/96–Reg–I (M–121) Vet., Government of Pakistan, Ministry of Health, Sep. 25, 1996.

Rose et al., "The Yeasts", vol. 3, 2nd edition, Metabolism and physiology of yeasts, pp. 226–229, 246, 379, 535, 1989.

Stanley et al., "The use of *Saccharomyces cerevisiae* to suppress the effects of aflatoxicosis in broiler chicks", Poultry Science, 1993, vol. 72, pp. 1867–1872.

Swamy et al. "Ability of Microsorb to counteract aflatoxicosis in commercial broilers", Indian Journal of Poultry Science, 1998, vol. 33 (3), pp. 273–278.

"Zeitgemabe Landbewirtschftung", Alva–Tagung in Gumpenstein, May 13–15, 1997, Arbeitsgemeinschaft Landwirtschaftlicher Versuchsanstalten in Austria, pp. 113.

Trenholm et al., "Mycotoxin binding agents: An update on what we know", Special: Nutrition and Feed Additives, Zootechnica International, Jan. 1997, p. 40–42.

Translation of letter dated Oct. 7, 2010 from Hirsch & Associes to the European Patent Office, Opposition to European Patent, No. EP 1079696 B1 of Alltech, Inc.

Edited by Anthony H. Rose and J. Stuart Harrison; The Yeasts, vol. 5, Second Edition, Yeast Technology, pp. 31–33; Published 1989.

Jeff Evans and Karl A. Dawson—The ability of Mycosorb to bind toxins present in endophyte–infected tall fescue; Published Aug. 29, 2007, pp. 1–13 as available at http://en.engomix.com/MA–mycotoxins/articles/the–ability–mycosorb–bind–t676/254–p0.htm.

Lyons, 1995, "Biotechnology in the Feed Industry: A Look Forward and Backward", In Biotechnology in the Feed Industry: Proceedings of Alltech's Eleventh Annual Symposium, eds. T.P. Lyons and K. A. Jacques, pp. 2–29, Nottingham University Press, Nottingham, UK.

Charmley et al., 1995, Mycotoxins; Their Origin, Impact and Importance: Insights into Common Methods of Control and Elimination, in Biotechnology in the Feed Industry: Proceedings of Alltech's Eleventh Annual Symposium, eds., T.P. Lyons and K. A. Jacques, pp. 41–63, Nottingham University Press, Nottingham, UK.

Trenholm et al., 1996, "Mycotoxin Binding Agents: An Update on What We Know", In Biotechnology In the Feed Industry: Proceedings of Alltech's Twelfth Annual Symposium, eds., T.P. Lyons and K. A. Jacques, pp. 327–349, Nottingham University Press, Nottingham, UK.

Devegowda, 1997, "Mycotoxins in Animal Feed: Novel Biotechnological Solutions", Paper presented at African Lecture Tour (Mar. 10–15, 1997).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10, 11, 15 and 17 are determined to be patentable as amended.

Claims 2-9, 12-14, 16 and 18-21, dependent on an amended claim, are determined to be patentable.

New claims 22 and 23 are added and determined to be patentable.

1. A composition for binding and thereby inactivating a mycotoxin in an animal feed, [comprising] *consisting essentially of* a modified yeast cell wall extract *concentrate* and a mineral clay, *wherein the modified yeast cell wall extract concentrate is formed by a process comprising growing whole yeast organisms comprising yeast cell walls and intracellular components in an alcohol environment to form modified yeast organisms with modified yeast cell walls, lysing said modified yeast organisms, and separating and removing the intracellular components from the modified yeast cell walls to form said modified yeast cell wall extract concentrate.*

10. The composition of claim 1, wherein the composition comprises from between about 1% to about 10% of the mineral clay and from between about 90% to about 99% of the *modified* yeast cell wall extract *concentrate*.

11. The composition of claim 10, wherein the composition of the invention comprises from between about 2% to about 4% of the mineral clay, and from between about 96% to about 98% of the *modified* yeast cell wall extract *concentrate*.

15. An animal feed [comprising] *consisting essentially of* a composition comprised of a modified yeast cell wall extract *concentrate of claim 1* and a mineral clay in an amount effective to bind and thereby inactivate a mycotoxin present in an animal feed.

17. A method for reducing mycotoxin contamination of an animal consuming a feedstuff, comprising feeding to an animal an effective amount of an composition comprising a modified yeast cell wall extract *concentrate of claim 1* and a mineral clay, thereby binding and inactivating the mycotoxin in the animal feed.

*22. The composition of claim 1, wherein the process for forming said modified yeast cell wall extract concentrate comprises lysing the modified yeast organisms and then washing by centrifugation said modified yeast organisms to separate and remove the intracellular components from the modified yeast cell walls.*

*23. The composition of claim 1, wherein the process for forming said modified yeast cell wall extract concentrate further comprises drying the modified yeast cell wall extract concentrate.*

\* \* \* \* \*